Dec. 22, 1959 — W. PEGLOW — 2,918,341
DISHRACK SUPPORTING STRUCTURE FOR DISHWASHER
Filed Dec. 28, 1956 — 2 Sheets-Sheet 1
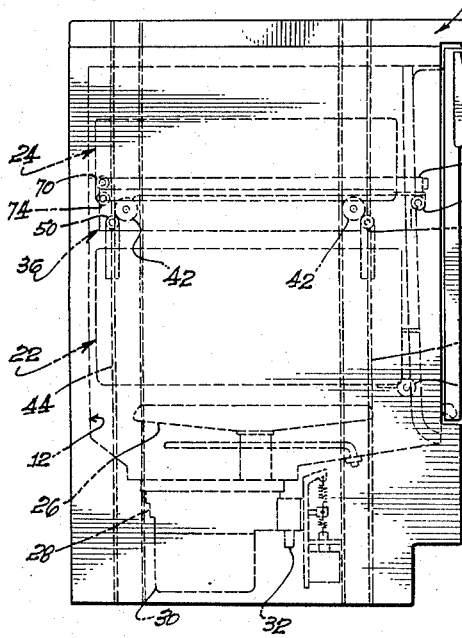
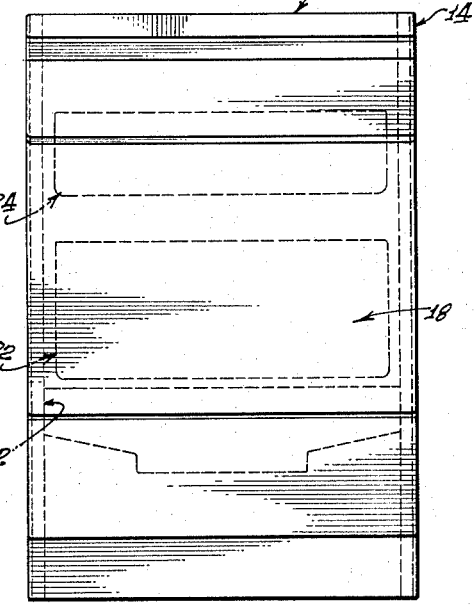
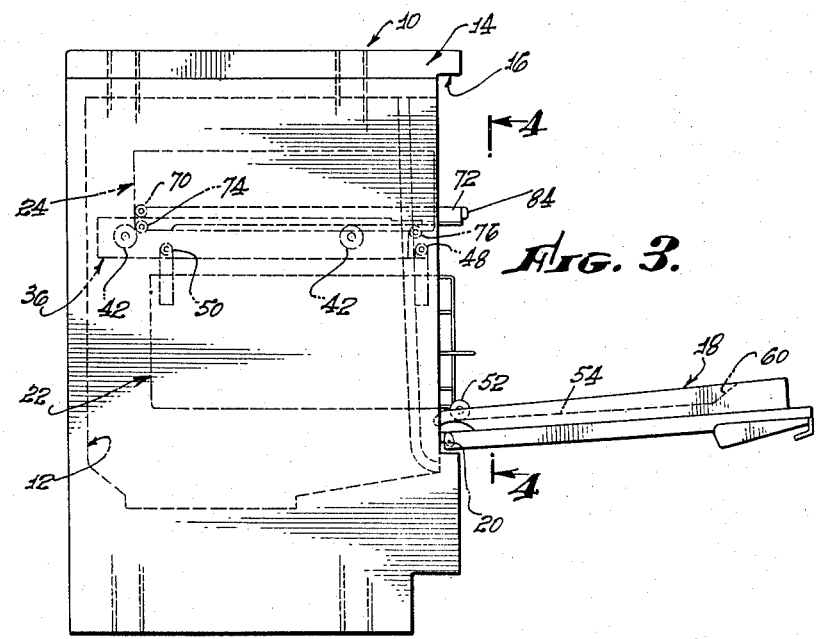
Walter Peglow,
Inventor.
By His Attorneys
Harris, Kiech, Foster & Harris Dec. 22, 1959 W. PEGLOW 2,918,341
DISHRACK SUPPORTING STRUCTURE FOR DISHWASHER
Filed Dec. 28, 1956 2 Sheets-Sheet 2

WALTER PEGLOW,
INVENTOR.
By His Attorneys
HARRIS, KIECH, FOSTER & HARRIS.

United States Patent Office 2,918,341
Patented Dec. 22, 1959

2,918,341

DISHRACK SUPPORTING STRUCTURE FOR DISHWASHER

Walter Peglow, Whittier, Calif., assignor to Waste King Corporation, Los Angeles, Calif., a corporation of California Application December 28, 1956, Serial No. 631,152

6 Claims. (Cl. 312—311)

The present invention relates in general to dishwashers and, more particularly, to supporting structure for dish racks designed to hold dishes, or other articles to be washed and rinsed, and preferably dried, such supporting structure permitting movement of the dish racks inwardly and outwardly between retracted and extended positions through a doorway leading into a dish chamber of the dishwasher.

In general, the present invention contemplates a dishwasher which includes a housing providing a dish chamber within which the dishes, or other articles, are to be washed and rinsed, and preferably dried, the housing providing at the front thereof a doorway for access to the interior of the dish chamber. The dishwasher includes at least one dish rack movable inwardly and outwardly through the doorway between a retracted position within the dish chamber and an extended position wherein the rack is at least partially withdrawn from the dish chamber for loading and unloading purposes. Preferably, the dishwasher includes two such dish racks one disposed above the other and respectively referred to hereinafter as upper and lower dish racks.

The invention further contemplates a dishwasher wherein the doorway is adapted to be closed by a door pivotally connected to the housing adjacent the lower edge of the doorway for movement between a generally vertical closed position and a generally horizontal open position, the dish racks being disposed above the open door when in their extended positions. The invention still further contemplates a dishwasher wherein the upper dish rack is supported by interengageable means on the housing and the upper dish rack for both the retracted and extended positions of the upper dish rack, but wherein the lower dish rack is supported by first interengageable means on the housing and the lower dish rack when the latter is in its retracted position, and by second interengageable means on the lower dish rack and on the housing and the door when the lower dish rack is in its extended position.

A primary object of the present invention is to provide a dishwasher wherein said first interengageable means for supporting the lower dish rack in its retracted position is inoperative when the lower dish rack is in its extended position, and wherein said second interengageable means for supporting the lower dish rack in its extended position is inoperative when the lower dish rack is in its retracted position, irrespective of whether the door is in its open position or in its closed position. In other words, when the lower dish rack is in its retracted position within the dish chamber, it is supported solely by said first interengageable means on the housing and the lower dish rack, the said second interengageable means on the lower dish rack and on the housing and the door being inoperative under such conditions. Thus, when the lower dish rack is in its retracted position, the door may be moved freely between its open and closed positions in either direction without interference by the lower dish rack, which is an important feature of the invention.

Another object is to provide a dishwasher having generally horizontal main track means in the dish chamber and extending toward the doorway and terminating in a front end; auxiliary track means on the inner surface of the door and generally perpendicular to the axis of pivotal connection of the door to the housing and having a rear end adjacent such axis; main front and rear roller means on the lower dish rack and engageable with the main track means, the main front roller means being disengaged from and disposed forwardly of the front end of the main track means when the dish rack is in its extended position; and an auxiliary roller means on the lower dish rack and engageable with the auxiliary track means when the door is in its open position, the auxiliary roller means being disengaged from and disposed rearwardly of the rear end of the auxiliary track means when the dish rack is in its retracted position for either the open position or the closed position of the door. With this construction, the auxiliary roller means cannot engage the auxiliary track means for any position of the door as long as the lower dish rack is in its retracted position within the dish chamber. Consequently, the door can be opened and closed freely without interference by the lower dish rack, which is an important feature.

Another object is to provide a dishwasher wherein the auxiliary roller means on the lower dish rack is located forwardly of the main front roller means thereon a predetermined distance and wherein the rear end of the auxiliary track means is located forwardly of the front end of the main track means a lesser distance when the door is in its open position, whereby the auxiliary roller means engages the auxiliary track means to support the front end of the lower dish rack before the main front roller means disengages the main track means to terminate support of the front end of the lower dish rack by the main track means. Thus, the weight of the front end of the lower dish rack is transferred from the main track means to the auxiliary track means smoothly during movement of the lower dish rack from its retracted position to its extended position, and is transferred from the auxiliary track means to the main track means smoothly during movement of the lower dish rack from its extended position to its retracted position, which is an important feature of the invention.

Another object is to provide a dishwasher wherein the front end of the main track means associated with the lower dish rack slopes downwardly and forwardly and wherein the rear end of the auxiliary track means associated with the lower dish rack slopes downwardly and rearwardly when the door is in its open position, whereby the transition between engagement of the front roller means with the main track means and engagement of the auxiliary roller means with the auxiliary track means is effected smoothly irrespective of whether the lower dish rack is being moved from its extended position into its retracted position, or from its retracted position into its extended position.

Another object is to provide stop means at the front end of the auxiliary track means on the door for engagement by the auxiliary roller means on the lower dish rack to prevent forward movement of the lower dish rack beyond its extended position.

Another object is to provide an upper dish rack having on opposite sides thereof upper rear rollers engageable with upper sides of upper main tracks on opposite sides of the dish chamber, having on opposite sides thereof lower rear rollers engageable with lower sides of such upper main tracks, and having on opposite sides thereof auxiliary tracks resting on front rollers mounted on the sides of the dish chamber. With this construction, when the upper dish rack is in its retracted position, it is supported as the result of interengagement between the upper rear rollers and the upper sides of the upper main tracks and as the result of interengagement between the auxiliary tracks and the front rollers mentioned. However, when the upper dish rack is in its extended position, it is supported as the result of interengagement between the lower rear rollers and the lower sides of the upper main tracks and as the result of interengagement between the auxiliary tracks and the front rollers mentioned.

Another object is to provide an upper dish rack wherein the auxiliary tracks mentioned are provided with stops engageable with the front rollers described to prevent movement of the upper dish rack forwardly beyond its extended position.

Another object is to provide a dishwasher wherein the upper main tracks associated with the upper dish rack terminate rearwardly of the front rollers associated therewith so that, by elevating the front end of the upper dish rack, the stops mentioned may be disengaged from the front rollers so as to permit disengagement of the upper and lower rear rollers from the upper main tracks.

Another object is to provide a dishwasher wherein the main track means associated with the lower dish rack includes two lower main tracks, such lower main tracks respectively being integral with main track members which respectively provide the upper main tracks associated with the upper dish rack.

Another object is to provide a dishwasher wherein the main front and rear roller means associated with the lower dish rack are connected to the upper end of the lower dish rack and wherein the main track means associated with the lower dish rack is located above the lower dish rack, the auxiliary roller means associated with the lower dish rack being connected to the lower end thereof.

The foregoing objects, advantages, features and results of the present invention, together with various other objects, advantages, features and results thereof which will be evident to those skilled in the dishwasher art in the light of this disclosure, may be attained with the exemplary embodiment of the invention described in detail hereinafter and illustrated in the accompanying drawings, in which:

Fig. 1 is a side elevational view of a dishwasher embodying the invention;

Fig. 2 is a front elevational view of the dishwasher;

Fig. 3 is a side elevational view of the dishwasher which is similar to Fig. 1, but which shows a door of the dishwasher in its open position and which shows upper and lower racks of the dishwasher in positions intermediate retracted and extended positions thereof, the door being shown in its closed position and the upper and lower racks being shown in their retracted positions in Fig. 1;

Figure 4:
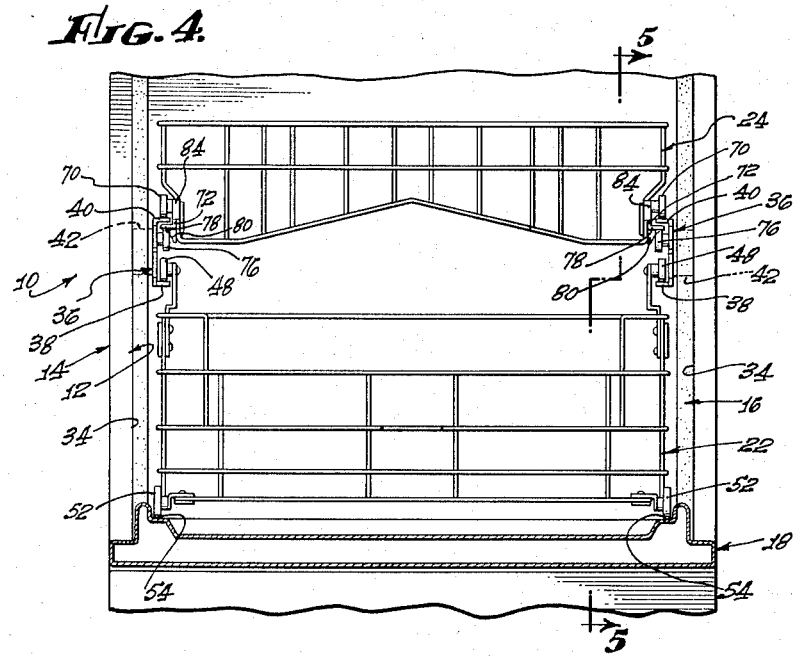
Fig. 4 is an enlarged, fragmentary sectional view taken along the arrowed line 4—4 of Fig. 3.

In the drawings, the numeral 10 designates a dishwasher of the invention which includes a housing providing a dish chamber 12 enclosed by a cabinet 14 in the particular construction illustrated, the housing providing a doorway 16 at the front of the dishwasher for access to the interior of the dish chamber. The doorway 16 is adapted to be closed by a door 18 pivotally mounted on the housing for movement between a generally vertical closed position, Fig. 1, and a generally horizontal open position, Fig. 3, about an axis 20 adjacent the lower edge of the door and doorway.

The dishwasher 10 also includes lower and upper dish racks 22 and 24 which are movable from retracted positions, Fig. 1, within the dish chamber 12 through the doorway 16 into extended positions, not shown, wherein these racks are at least partially withdrawn from the dish chamber for ease of loading dishes, or other articles, into the racks and for removing the dishes therefrom. The manner in which the dish racks 22 and 24 are supported for movement between their extended and retracted positions constitutes the present invention and will be considered in detail hereinafter.

Within the dish chamber 12 below the lower dish rack 22 is an impeller 26 for spraying, washing and rinsing fluids upwardly over dishes, or other articles, in the racks 22 and 24 during washing and rinsing of the dishes. While other types of impellers may be used, the particular impeller shown is of the reaction type and is supplied with fluid from the bottom of the dish chamber 12 by a pump 28 driven by a motor 30, the inlet of the pump being connected to the bottom of the dish chamber and the outlet thereof being selectively connectible to the impeller 26 and to a drain 32. Thus, after washing fluid, or rinsing fluid, has been circulated over the dishes in the racks 22 and 24 by connecting the outlet of the pump 28 to the impeller 26, the outlet of the pump may be connected to the drain 32 to discharge the fluid from the dish chamber 12 after use.

Considering first the manner in which the lower dish rack 22 is supported, mounted on opposite sides 34 of the dish chamber 12, and on opposite sides of the doorway 16, are generally horizontal, parallel, fore-and-aft-extending, main track members 36 providing lower and upper main tracks 38 and 40, the track members being channel shaped in cross section and the lower and upper tracks 38 and 40 being provided by flanges thereof. The main track members 36 are spaced inwardly from the sides 34 of the dish chamber 12 by spacers 42, and are secured to frame members 44 of the dishwasher 10 by bolts 46.

Connected to the upper end of the lower dish rack 22 on opposite sides thereof are front main rollers 48 adapted to rest on the upper sides of the lower main tracks 38, rear main rollers 50 adapted to rest on the upper sides of the lower main tracks 38 being similarly connected to the upper end of the lower dish rack on opposite sides thereof. When the lower dish rack 22 is in its retracted position within the dish chamber 12, it is supported by engagement of the front and rear main rollers 48 and 50 with the lower main tracks 38, these elements forming the first interengageable means hereinbefore mentioned.

Figure 5:
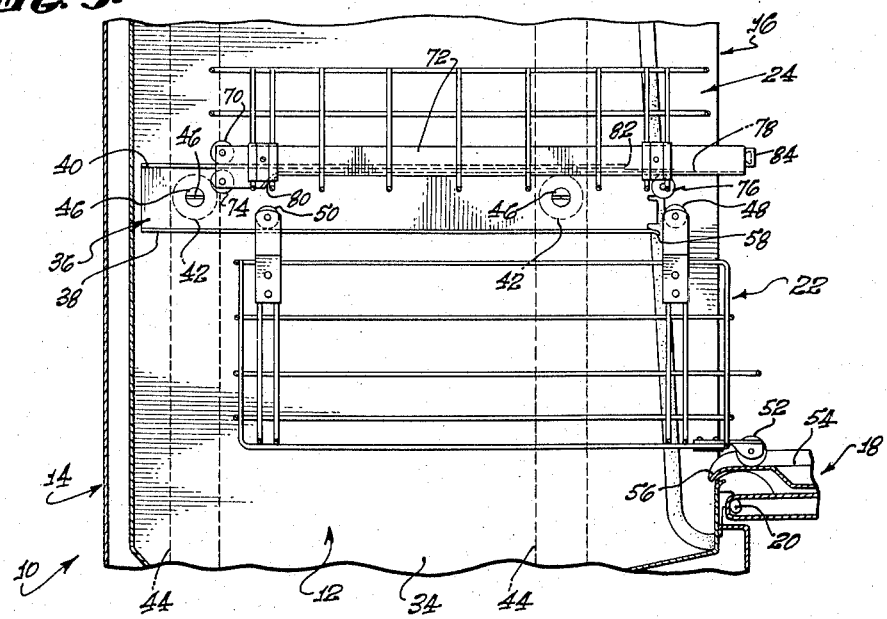
Fig. 5 is a sectional view taken along the arrowed line 5—5 of Fig. 4.

Connected to the lower end of the lower dish rack 22 at the front thereof and extending forwardly of the lower dish rack are auxiliary rollers 52 engageable with auxiliary tracks 54 on the inner surface of the door 18 when the door is in its open position, these auxiliary tracks being perpendicular to the pivot axis 20 of the door and being parallel. When the lower dish rack 22 is in its extended position, it is supported as the result of engagement of the auxiliary rollers 52 with the auxiliary tracks 54 and as the result of engagement of the rear main rollers 50 with the lower main tracks 38. This is shown in Figs. 3 and 5 of the drawings, wherein the lower dish rack 22 is in a partially extended position intermediate its retracted position and its fully extended position.

Considering the operation of the lower dish rack 22, it will be apparent that when this dish rack is in its retracted position within the dish chamber 12, it is supported entirely by interengagement between the front and rear main rollers 48 and 50 and the lower main tracks 38. As the lower dish rack 22 is moved forwardly toward its extended position, the auxiliary rollers 52 engage the auxiliary tracks 54 and the front main rollers 48 disengage the lower main tracks 38 to transfer the weight of the front end of the dish rack 22 from the lower main tracks 38 to the auxiliary tracks 54 on the door 18, the weight of the rear end of the lower dish rack being carried at all times by the lower main tracks 38. Thus, the lower dish rack 22 is in effect rolled outwardly onto the open door 18 into its extended position so that it may be loaded or unloaded readily.

An important feature of the invention is that, when the lower dish rack 22 is in its retracted position within the dish chamber 12, the auxiliary rollers 52 are located rearwardly of the rear ends 56 of the auxiliary tracks 54 and out of engagement therewith for either position of the door, the front main rollers 48 being located forwardly of and out of engagement with the front ends 58 of the lower main tracks 38 when the lower dish rack is in its extended position.

The advantage of having the auxiliary rollers 52 out of engagement with the auxiliary tracks 54 and located rearwardly of the rear ends 56 of the auxiliary tracks when the lower dish rack 22 is in its retracted position is that the lower dish rack does not in any way interfere with opening or closing movement of the door 18. In other words, when the lower dish rack 22 is in its retracted position, it is completely out of engagement with the door 18 for all positions of the door so that the door may be opened or closed without interference.

As best shown in Fig. 5 of the drawings, the auxiliary rollers 52 are located forwardly of the front main rollers 48 a distance exceeding the distance which the rear ends 56 of the auxiliary tracks 54 are located forwardly of the front ends 58 of the lower main tracks 38. This insures engagement of the auxiliary rollers 52 with the auxiliary tracks 54 prior to disengagement of the front main rollers 48 from the lower main tracks 38 so as to insure against dropping of the front end of the lower dish rack 22. The front ends 58 of the lower main tracks 38 slope downwardly and forwardly and the rear ends 56 of the auxiliary tracks 54 slope downwardly and rearwardly when the door is open. This provides for a smooth transition between the interengagement of the front main rollers 48 and the lower main tracks 38 and interengagement of the auxiliary rollers 52 and the auxiliary tracks 54 in either direction, which is an important feature. In other words, as the front main rollers 48 ride downwardly and forwardly along the front ends 58 of the lower main tracks 38, the auxiliary rollers 52 engage and ride upwardly and forwardly along the rear ends 56 of the auxiliary tracks 54 to provide a smooth transition, a similar transition occurring during rearward movement of the lower dish rack 22 into its retracted position.

In order to prevent forward movement of the lower dish rack 22 beyond its fully extended position, the auxiliary rollers 52 engage stops 60 at the forward ends of the auxiliary tracks 54, these stops being formed by portions of the inner surface of the door 18 which slope upwardly and forwardly when the door is in its open position.

It will be apparent that the lower dish rack 22 may be removed completely if desired by merely picking it up and lifting it forwardly and upwardly after it has been rolled forwardly along the lower main tracks 38 and the auxiliary tracks 54 on the door 18 into its fully extended position.

Turning now to the upper dish rack 24, it is provided on opposite sides thereof with upper rear rollers 70 carried by generally horizontal, parallel, fore-and-aft-extending, auxiliary track members 72 mounted on opposite sides of this dish rack. The upper rear rollers 70 are engageable with the upper sides of the respective upper main tracks 40. Also carried by the auxiliary track members 72 on opposite sides of the upper dish rack 24 are lower rear rollers 74 respectively engageable with the lower sides of the upper main tracks 40. Mounted on the sides 34 of the dish chamber 12, or more accurately, on the main track members 36 adjacent the front ends thereof, are front rollers 76 on which auxiliary tracks 78 provided by the auxiliary track members 72 rest, respectively.

Considering the operation of the supporting structure for the upper dish rack 24, it will be apparent that when the upper dish rack is in its retracted position within the dish chamber 12, the upper rear rollers 70 rest on the upper sides of the upper main tracks 40 and the auxiliary tracks 78 rest on the front rollers 76 to support the upper dish rack. However, as the upper dish rack 24 is moved forwardly toward its fully extended position through an intermediate position wherein its center of gravity is disposed in alignment with the axes of the front rollers 76, the upper dish rack tends to tilt forwardly and downwardly. Consequently, under such conditions, the upper dish rack 24 is supported by interengagement between the lower rear rollers 74 and the lower sides of the upper main tracks 40 and by interengagement between the auxiliary tracks 78 and the front rollers 76. When the center of gravity of the upper dish rack 24 is again shifted rearwardly of the pivot axes of the front rollers 76, the conditions previously outlined are restored.

The auxiliary tracks 78 provide stops 80 which are engageable with the front rollers 76 to prevent movement of the upper dish rack 24 forwardly beyond its fully extended position. The front rollers 76 are located forwardly of the front ends 82 of the upper main tracks 40 so that, when the upper dish rack 24 reaches its fully extended position, the forward end thereof may be lifted upwardly and forwardly to cause the stops 80 to move upwardly and forwardly over the front rollers 76, at which time the lower rear rollers 74 clear the front ends 82 of the upper main tracks 40 and are disposed between the front ends 82 thereof and the front rollers 76 so that they may be moved upwardly to disengage the rollers 70 and 74 from the upper main tracks 40. Thus, the upper dish rack 24 may be completely removed.

It will be noted that the upper dish rack 24 is provided at the front thereof with bumpers 84 engageable by the inner surface of the door 18 to move the upper dish rack rearwardly all the way into its retracted position as the door 18 is closed, if the upper dish rack is not already in such position. If the lower dish rack 22 is not in its retracted position when the door 18 is closed, the inner surface of the door acts on the auxiliary rollers 52 to move the lower dish rack into its retracted position. Thus, even if the two dish racks are not all the way into their retracted positions when the door 18 is closed, closure of the door will move them rearwardly into their retracted positions in the foregoing manner.

Although an exemplary embodiment of the present invention has been disclosed herein for purposes of illustration, it will be understood that various changes, modifications and substitutions may be incorporated in such embodiment without departing from the spirit of the invention as defined by the claims which follow:

I claim as my invention:

1. In a dishwasher, the combination of: a housing providing a dish chamber and having at the front thereof a doorway for access to the interior of said dish chamber; a door pivotally connected to said housing adjacent the lower edge of said doorway for movement between a generally vertical closed position and a generally horizontal open position; generally horizontal main track means in said dish chamber and extending toward said doorway and terminating in a front end; auxiliary track means on the inner surface of said door and generally perpendicular to the axis of pivotal connection of said door to said housing and having a rear end adjacent said axis; a dish rack movable through said doorway between a retracted position within said dish chamber and an extended position above said door when the latter is in said open position; main front and rear track follower means on said dish rack and engageable with said main track means, said rear track follower means being in engagement with said main track means in both said retracted and extended positions of said dish rack so that said main track means supports the rear of said dish rack in both said extended and retracted positions thereof, said main front track follower means being disengaged from and disposed forwardly of said front end of said main track means when said dish rack is in said extended position with said door in said open position, and said main front track follower means being disposed rearwardly of said front end of said main track means a predetermined distance when said dish rack is in its retracted position; and auxiliary track follower means on said dish rack and engageable with said auxiliary track means when said door is in said open position, said auxiliary track follower means being disengaged from and disposed rearwardly of said rear end of said auxiliary track means a distance less than said predetermined distance when said dish rack is in said retracted position and when said door is in said open position, whereby said auxiliary track follower means engages said auxiliary track means before said main front track follower means disengages said main track means during movement of said dish rack from its retracted position to its extended position.

2. In a dishwasher, the combination of: a housing providing a dish chamber and having at the front thereof a doorway for access to the interior of said dish chamber; a door pivotally connected to said housing adjacent the lower edge of said doorway for movement between a generally vertical closed position and a generally horizontal open position; two spaced, parallel track members respectively mounted on the sides of said dish chamber on opposite sides of said doorway and respectively providing generally horizontal main tracks extending toward said doorway and terminating in front ends; two spaced, parallel auxiliary tracks on the inner surface of said door and generally perpendicular to the axis of pivotal connection of said door to said housing and having rear ends adjacent said axis; a dish rack movable through said doorway between a retracted position within said dish chamber and an extended position above said door when the latter is in said open position; main front and rear rollers on said dish rack and respectively engageable with said main tracks, said rear rollers being in engagement with said main tracks in both said retracted and extended positions of said dish rack so that said main tracks support the rear of said dish rack in both said extended and retracted positions thereof, said main front rollers being disengaged from and disposed forwardly of said front ends of said main tracks when said dish rack is in said extended position with said door in said open position, and said main front rollers being disposed rearwardly of said front ends of said main tracks a predetermined distance when said dish rack is in its retracted position; and auxiliary rollers on said dish rack and respectively engageable with said auxiliary tracks when said door is in said open position, said auxiliary rollers beng disengaged from and disposed rearwardly of said rear ends of said auxiliary tracks a distance less than said predetermined distance when said dish rack is in said retracted position and when said door is in said open position, whereby said auxiliary rollers engage said auxiliary tracks before said main front rollers disengage said main tracks during movement of said dish rack from its retracted position to its extended position.

3. In a dishwasher, the combination of: a housing providing a dish chamber and having at the front thereof a doorway for access to the interior of said dish chamber; a door pivotally connected to said housing adjacent the lower edge of said doorway for movement between a generally vertical closed position and a generally horizontal open position; generally horizontal main track means in said dish chamber and extending toward said doorway and terminating in a front end; auxiliary track means on the inner surface of said door and generally perpendicular to the axis of pivotal connection of said door to said housing and having a rear end adjacent said axis; a dish rack movable through said doorway between a retracted position within said dish chamber and an extended position above said door when the latter is in said open position; main front and rear track follower means on said dish rack and engageable with said main track means, said rear track follower means being in engagement with said main track means in both said retracted and extended positions of said dish rack so that said main track means supports the rear of said dish rack in both said extended and retracted positions thereof, said main front track follower means being disengaged from and disposed forwardly of said front end of said main track means when said dish rack is in said extended position with said door in said open position; and auxiliary track follower means on said dish rack and engageable with said auxiliary track means when said door is in said open position, said auxiliary track follower means being disengaged from and disposed rearwardly of said rear end of said auxiliary track means when said dish rack is in said retracted position and when said door is in either said open position or said closed position, said auxiliary track follower means being located forwardly of said main front track follower means a predetermined distance and said rear end of said auxiliary track means being located forwardly of said front end of said main track means a lesser distance when said door is in said open position, whereby said auxiliary track follower means engages said auxiliary track means before said main front track follower means disengages said main track means during movement of said dish rack from its retracted position to its extended position.

4. In a dishwasher, the combination of: a housing providing a dish chamber and having at the front thereof a doorway for access to the interior of said dish chamber; a door pivotally connected to said housing adjacent the lower edge of said doorway for movement between a generally vertical closed position and a generally horizontal open position; two spaced, parallel track members respectively mounted on the sides of said dish chamber on opposite sides of said doorway and respectively providing generally horizontal main tracks extending toward said doorway and terminating in front ends; two spaced, parallel auxiliary tracks on the inner surface of said door and generally perpendicular to the axis of pivotal connection of said door to said housing and having rear ends adjacent said axis; a dish rack movable through said doorway between a retracted position within said dish chamber and an extended position above said door when the latter is in said open position; main front and rear rollers on said dish rack and respectively engageable with said main tracks, said rear rollers being in engagement with said main tracks in both said retracted and extended positions of said dish rack so that said main tracks support the rear of said dish rack in both said extended and retracted positions thereof, said main front rollers being disengaged from and disposed forwardly of said front ends of said main tracks when said dish rack is in said extended position with said door in said open position; and auxiliary rollers on said dish rack and respectively engageable with said auxiliary tracks when said door is in said open position, said auxiliary rollers being disengaged from and disposed rearwardly of said rear ends of said auxiliary tracks when said dish rack is in said retracted position and when said door is in either of said open and closed positions, said auxiliary rollers being located forwardly of said main front rollers a predetermined distance and said rear ends of said auxiliary tracks being located forwardly of said front ends of said main tracks a lesser distance when said door is in said open position, whereby said auxiliary rollers engage said auxiliary tracks before said main front rollers disengage said main tracks during movement of said dish rack from its retracted position to its extended position.

5. In a dishwasher, the combination of: a housing providing a dish chamber and having at the front thereof a doorway for access to the interior of said dish chamber; a door pivotally connected to said housing adjacent the lower edge of said doorway for movement between a generally vertical closed position and a generally horizontal open position; two spaced, parallel track members respectively mounted on the sides of said dish chamber on opposite sides of said doorway and respectively providing generally horizontal main tracks extending toward said doorway and terminating in downwardly and forwardly sloping front ends; two spaced, parallel auxiliary tracks on the inner surface of said door and generally perpendicular to the axis of pivotal connection of said door to said housing and having rear ends adjacent said axis, said rear ends sloping upwardly and forwardly when said door is in said open position; a dish rack movable through said doorway between a retracted position within said dish chamber and an extended position above said door when the latter is in said open position; main front and rear rollers on said dish rack and respectively engageable with said main tracks, said rear rollers being in engagement with said main tracks in both said retracted and extended positions of said dish rack so that said main tracks support the rear of said dish rack in both said extended and retracted positions thereof, said main front rollers being disengaged from and disposed forwardly of said front ends of said main tracks when said dish rack is in said extended position with said door in said open position, and said main front rollers being disposed rearwardly of said front ends of said main tracks a predetermined distance when said dish rack is in its retracted position; and auxiliary rollers on said dish rack and respectively engageable with said auxiliary tracks when said door is in said open position, said auxiliary rollers being disengaged from and disposed rearwardly of said rear ends of said auxiliary tracks a distance less than said predetermined distance when said dish rack is in said retracted position and when said door is in said open position, whereby said auxiliary rollers engage said auxiliary tracks before said main front rollers disengage said main tracks during movement of said dish rack from its retracted position to its extended position.

6. A dishwasher according to claim 2 wherein said track members are above said dish rack and said main front and rear rollers are connected to the upper end of said dish rack, said auxiliary rollers being connected to the lower end of the dish rack.

References Cited in the file of this patent

UNITED STATES PATENTS

| | | |
|---|---|---|
| 1,206,730 | Rideout | Nov. 28, 1916 |
| 2,088,957 | Hoffstetter et al. | Aug 3, 1937 |
| 2,681,843 | Walker | June 22, 1954 |
| 2,739,025 | Stoddard | Mar. 20, 1956 |
| 2,745,707 | Sebens | May 15, 1956 |

FOREIGN PATENTS

| | | |
|---|---|---|
| 228,613 | Switzerland | Dec. 1, 1943 |